(12) United States Patent  
Seo et al.

(10) Patent No.: US 9,838,162 B2  
(45) Date of Patent: Dec. 5, 2017

(54) METHOD AND APPARATUS FOR PERFORMING HARQ PROCESSES IN CARRIER AGGREGATION SYSTEMS

(71) Applicant: LG ELECTRONICS INC., Seoul (KR)

(72) Inventors: Dongyoun Seo, Anyang-si (KR); Joonkui Ahn, Anyang-si (KR); Suckchel Yang, Anyang-si (KR); Daesung Hwang, Anyang-si (KR); Bonghoe Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 227 days.

(21) Appl. No.: 14/377,796

(22) PCT Filed: Feb. 8, 2013

(86) PCT No.: PCT/KR2013/001042  
§ 371 (c)(1),  
(2) Date: Aug. 8, 2014

(87) PCT Pub. No.: WO2013/119078  
PCT Pub. Date: Aug. 15, 2013

(65) Prior Publication Data  
US 2016/0072612 A1    Mar. 10, 2016

Related U.S. Application Data

(60) Provisional application No. 61/597,115, filed on Feb. 9, 2012, provisional application No. 61/736,528, filed on Dec. 12, 2012.

(51) Int. Cl.  
*H04L 1/18*  (2006.01)  
*H04L 1/22*  (2006.01)

(52) U.S. Cl.  
CPC .......... *H04L 1/1835* (2013.01); *H04L 1/1874* (2013.01); *H04L 1/22* (2013.01)

(58) Field of Classification Search  
None  
See application file for complete search history.

(56) References Cited

U.S. PATENT DOCUMENTS

2009/0013232 A1    1/2009  Wan et al.  
2012/0307689 A1*  12/2012  Kim ..................... H04L 1/1861  
370/280

(Continued)

FOREIGN PATENT DOCUMENTS

KR    10-2006-0049856 A    5/2006  
KR    10-2008-0065880 A    7/2008

(Continued)

*Primary Examiner* — Chirag Shah  
*Assistant Examiner* — Amar Persaud  
(74) *Attorney, Agent, or Firm* — Dentons US LLP

(57) ABSTRACT

The present invention relates to a method for managing a soft buffer for the hybrid automatic repeat request (HARQ) of a terminal to which a plurality of cells are set in a wireless communication system, and to an apparatus using the method. Through the method, information is received about the maximum number of cells capable of being simultaneously scheduled from among a plurality of cells, and the size of the soft buffer is determined for storing transmission blocks or code blocks of each cell on the basis of the information.

5 Claims, 19 Drawing Sheets

(56) References Cited

U.S. PATENT DOCUMENTS

| | | | |
|---|---|---|---|
| 2013/0051289 A1* | 2/2013 | Hsieh | H04L 1/1845 370/280 |
| 2013/0070652 A1* | 3/2013 | Li | H04L 1/1822 370/280 |
| 2013/0176981 A1* | 7/2013 | Earnshaw | H04L 1/02 370/329 |
| 2013/0286904 A1* | 10/2013 | Xu | H04L 5/001 370/280 |
| 2014/0198758 A1* | 7/2014 | Nimbalker | H04L 1/1822 370/329 |
| 2015/0181590 A1* | 6/2015 | Park | H04L 1/1812 370/280 |
| 2015/0195062 A1* | 7/2015 | Hwang | H04L 1/1607 370/329 |
| 2015/0282138 A1* | 10/2015 | Choi | H04L 5/0092 370/329 |
| 2015/0333891 A1* | 11/2015 | Cheng | H04L 1/1835 370/329 |
| 2016/0309417 A1* | 10/2016 | Han | H04W 52/36 |

FOREIGN PATENT DOCUMENTS

| | | |
|---|---|---|
| KR | 10-2009-0008150 A | 1/2009 |
| KR | 10-2010-0107418 A | 10/2010 |

* cited by examiner

METHOD AND APPARATUS FOR PERFORMING HARQ PROCESSES IN CARRIER AGGREGATION SYSTEMS

This Application is a 35 U.S.C. §371 National Stage entry of International Application No. PCT/KR2013/001042, filed Feb. 8, 2013, which claims benefit of Provisional Application No. 61/597,115 filed Feb. 9, 2012 and Provisional Application No. 61/736,528 filed Dec. 12, 2012, both of which are incorporated by reference in their entirety herein.

BACKGROUND OF THE INVENTION

Field of the Invention

The present invention relates to wireless communications, and more particularly, to a method of performing a hybrid automatic repeat request (HARQ) by a user equipment which supports a carrier aggregation, and the user equipment using the method.

Related Art

An error compensation scheme is used to secure wireless communication reliability. Examples of the error compensation scheme include a forward error correction (FEC) scheme and an automatic repeat request (ARQ) scheme. In the FEC scheme, errors in a receiving end are corrected by attaching an extra error correction code to information bits. The FEC scheme has an advantage in that a time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In the HARQ, if the error is not detected from the received data, a receiver transmits a positive-acknowledgement (ACK) signal as a reception acknowledgement to report to a transmitter that reception is successful. If the error is detected from the received data, the receiver transmits a negative-acknowledgement (NACK) signal as the reception acknowledgement to report to the transmitter that the error is detected. The transmitter can retransmit the data upon receiving the NACK signal.

In a conventional wireless communication system, only one carrier is considered even if a bandwidth between an uplink and a downlink is configured differently from each other. The carrier is defined with a center frequency and a bandwidth. For example, long term evolution (LTE) based on $3^{rd}$ generation partnership project (3GPP) technical specification (TS) release 8 is a most dominant next mobile communication standard.

The 3GPP LTE system supports only one bandwidth (i.e., one component carrier) among {1.4, 3, 5, 10, 15, 20}MHz. That is, it may be a single-carrier system. LTE-advanced (A) evolved from LTE may be a multiple carrier system. In order to support a full bandwidth of 40 MHz, the multiple carrier system may use two component carriers having a bandwidth of 20 MHz or may use 3 component carriers respectively having bandwidths of 20 MHz, 15 MHz, and 5 MHz.

On the other hand, a future carrier aggregation system may use a plurality of component carriers having a smaller bandwidth than a full bandwidth. The multiple carrier system may be also called a carrier aggregation system.

Advantageously, the multiple carrier system can support backward compatibility with respect to legacy systems, and can significantly increase a data rate by using multiple carriers.

On the other hand, the number of HARQ processors can be significantly increased in a multiple carrier system in comparison with a single carrier system. That is, the increase in the number of HARQ processors may result in the increase in the number of HARQ processes that can be performed simultaneously. However, a reception buffer size of a user equipment has to be taken into account to perform HARQ. Since the reception buffer size has an effect on manufacturing costs of the user equipment, capability of the user equipment is limited in general.

Due to the limited reception buffer size of the user equipment, even if the number of HARQ processes is increased, a size of a buffer for each HARQ process is decreased, which may result in the decrease in a coding gain.

SUMMARY OF THE INVENTION

The present invention provides a method and apparatus for performing a hybrid automatic repeat request (HARQ) process in a multiple carrier system.

According to an aspect of the present invention, a method of managing a soft buffer for a hybrid automatic repeat request (HARQ) of a user equipment configured with a plurality of cells in a wireless communication system is provided. The method includes: receiving information regarding the maximum number of cells that can be scheduled simultaneously among the plurality of cells; and determining a size of the soft buffer for storing a transmission block or code block of each cell on the basis of the information.

According to another aspect of the present invention, there is provided a user equipment including: a radio frequency (RF) unit for transmitting or receiving a radio signal; and a processor operatively coupled to the RF unit, wherein the processor is configured for: receiving information regarding the maximum number of cells that can be scheduled simultaneously among the plurality of cells; and determining a size of the soft buffer for storing a transmission block or code block of each cell on the basis of the information.

A hybrid automatic repeat request (HARQ) process can be managed in multiple carriers while maintaining an HARQ process mechanism used in a single carrier. HARQ using multiple carriers can be effectively performed under a limitation of a reception buffer size of a user equipment.

DESCRIPTION OF EXEMPLARY EMBODIMENTS

Figure 1:
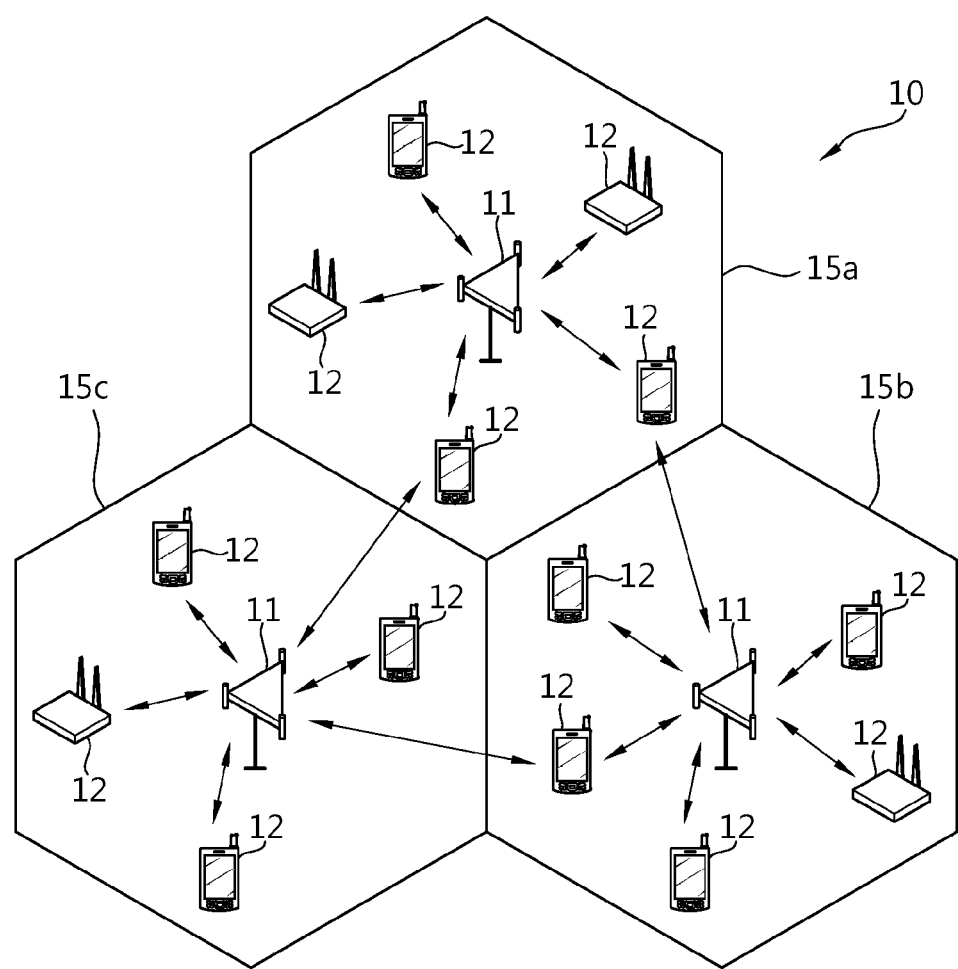
FIG. 1 shows a wireless communication system.

FIG. 1 shows a wireless communication system. Referring to FIG. 1, a wireless communication system 10 includes at least one base station (BS) 11. The BS 11 is generally a fixed station that communicates with a user equipment (UE) 12 and may be referred to as another terminology, such as an evolved node-B (eNB), a base transceiver system (BTS), an access point, etc. Each BS 11 provides a communication service to specific geographical regions 15a, 15b, and 15c.

The UE 12 may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

The wireless communication system 10 can be briefly classified into a system based on a frequency division duplex (FDD) scheme and a system based on a time division duplex (TDD) scheme. In the FDD scheme, uplink transmission and downlink transmission are achieved while occupying different frequency bands. In the TDD scheme, uplink transmission and downlink transmission are achieved at different times while occupying the same frequency band.

Figure 2:
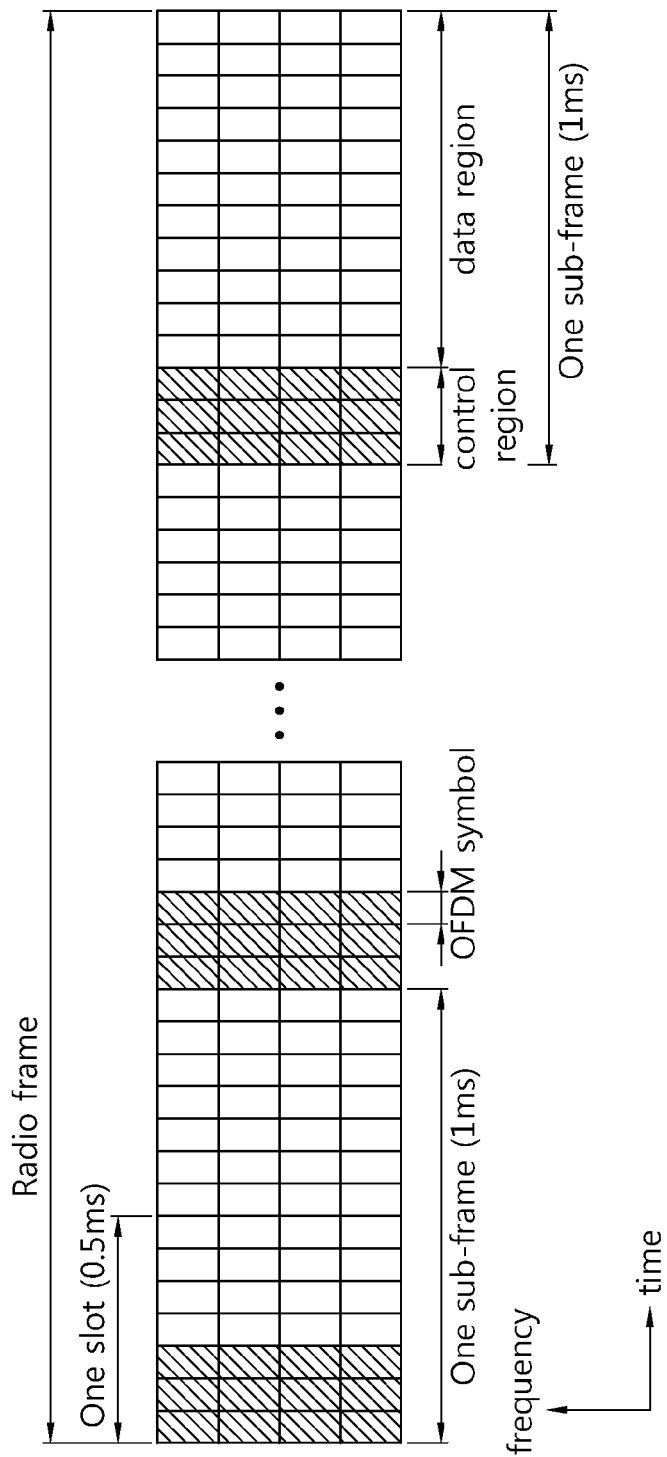
FIG. 2 shows a radio frame structure in $3^{rd}$ generation partnership project (3GPP) long term evolution (LTE).

FIG. 2 shows a radio frame structure in $3^{rd}$ generation partnership project (3GPP) long term evolution (LTE). The sections 4 and 6 of 3GPP TS 36.211 V8.5.0 (2008-12) "Evolved Universal Terrestrial Radio Access (E-UTRA); Physical Channels and Modulation (Release 8)" may be incorporated herein by reference.

A radio frame may include an FDD radio frame and a TDD radio frame.

The FDD radio frame consists of 10 subframes indexed with 0 to 9. One subframe consists of 2 slots.

When the TDD radio frame (hereinafter, a TDD frame) are indexed starting from 0, a subframe having an index #1 and an index #6 is called a special subframe (simply referred to as an S subframe), and includes a downlink pilot time slot (DwPTS), a guard period (GP), and an uplink pilot time slot (UpPTS). The DwPTS is used in a UE for initial cell search, synchronization, or channel estimation. The UpPTS is used in a BS for channel estimation and uplink transmission synchronization of the UE. The GP is a period for removing interference which occurs in an uplink due to a multi-path delay of a downlink signal between the uplink and a downlink. The GP and the UpPTS take a role of a time gap. In addition, in the TDD frame, a downlink (DL) subframe and an uplink (UL) subframe coexist. Table 1 below shows an example of a UL-DL configuration of TDD.

TABLE 1

| Uplink-downlink configuration | Downlink-to-Uplink Switch-point periodicity | Subframe n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, 'D' denotes a DL subframe, 'U' denotes a UL subframe, and 'S' denotes a special subframe. Upon receiving the DL-UL configuration from the BS, the UE can know whether each subframe is a DL subframe or a UL subframe in the TDD subframe.

A time required for transmitting one subframe is defined as a transmission time interval (TTI). For example, one subframe may have a length of 1 millisecond (ms), and one slot may have a length of 0.5 ms.

Meanwhile, one slot may include a plurality of orthogonal frequency division multiplexing (OFDM) symbols in a time domain. Since the 3GPP LTE uses orthogonal frequency division multiple access (OFDMA) in a downlink, the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.5.0 (2008-12), in case of a normal CP, one slot includes 7 OFDM symbols, and in case of an extended CP, one slot includes 6 OFDM symbols.

A resource block (RB) is a resource allocation unit, and includes a plurality of subcarriers in one slot. If one slot includes 7 OFDM symbols in a time domain and the RB includes 12 subcarriers in a frequency domain, one RB can include 7×12 resource elements (REs).

A subframe is divided into a control region and a data region in the time domain. The control region includes up to four preceding OFDM symbols of a $1^{st}$ slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V8.5.0 (2008-12), the LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The PCFICH transmitted in a 1$^{st}$ OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

The 3GPP LTE uses synchronous HARQ in UL transmission, and uses asynchronous HARQ in DL transmission. In the synchronous HARQ, retransmission timing is fixed. In the asynchronous HARQ, the retransmission timing is not fixed. In the synchronous HARQ, initial transmission and retransmission are performed with an HARQ interval.

Figure 3:
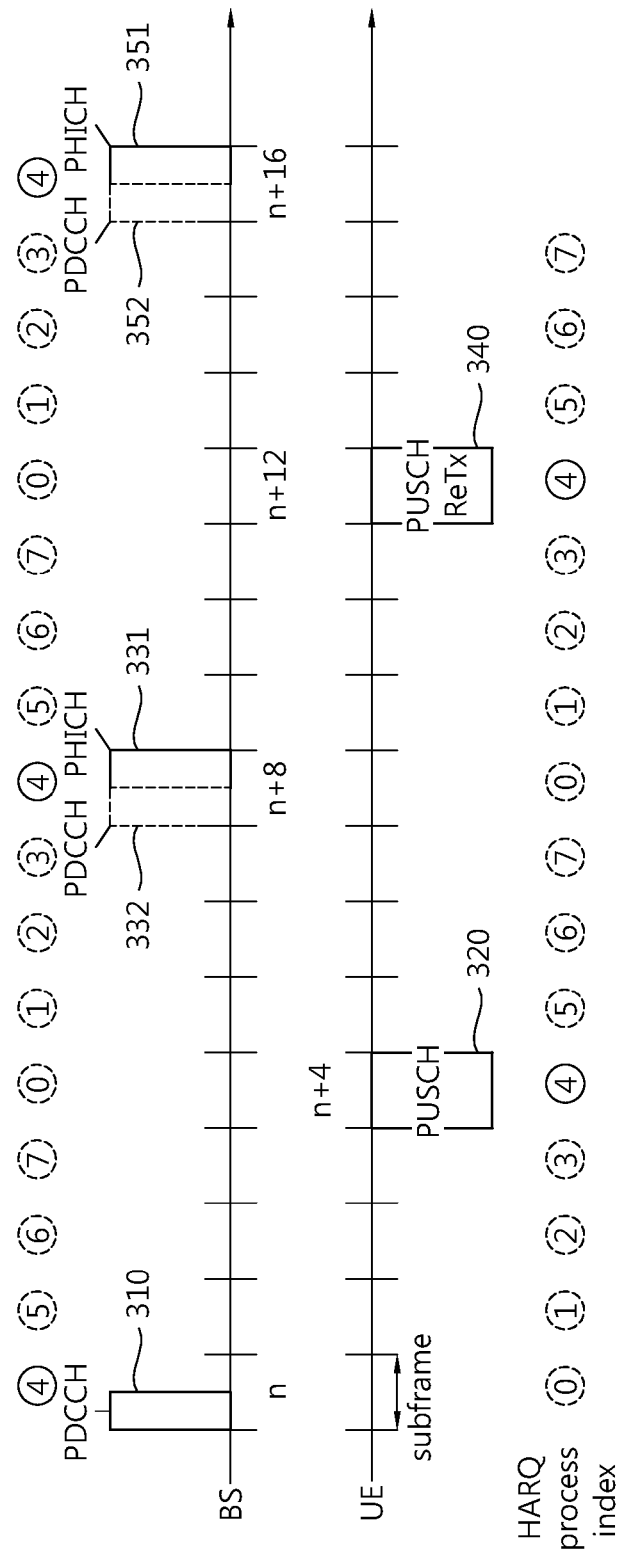
FIG. 3 shows uplink synchronous HARQ in 3GPP LTE.

FIG. 3 shows UL synchronous HARQ in 3GPP LTE.

A UE receives an initial UL grant on a PDCCH 310 from a BS in an n$^{th}$ subframe.

The UE transmits a UL transport block on a PUSCH 320 by using the initial UL grant in an (n+4)$^{th}$ subframe.

The BS sends an ACK/NACK signal for the UL transport block on a PHICH 331 in an (n+8)$^{th}$ subframe. The ACK/NACK signal indicates a reception acknowledgement for the UL transport block. The ACK signal indicates a reception success, and the NACK signal indicates a reception failure. When the ACK/NACK signal is the NACK signal, the BS may send a retransmission UL grant on a PDCCH 332, or may not send an additional UL grant.

Upon receiving the NACK signal, the UE sends a retransmission block on a PUSCH 340 in an (n+12)$^{th}$ subframe. For the transmission of the retransmission block, if the retransmission UL grant is received on the PDCCH 332, the UE uses the retransmission UL grant, and if the retransmission UL grant is not received, the UE uses the initial UL grant.

The BS sends an ACK/NACK signal for the UL transport block on a PHICH 351 in an (n+16)$^{th}$ subframe. When the ACK/NACK signal is the NACK signal, the BS may send a retransmission UL grant on a PDCCH 352, or may not send an additional UL grant.

After initial transmission is performed in the (n+4)$^{th}$ subframe, retransmission is performed in the (n+12)$^{th}$ subframe, and thus synchronous HARQ is performed with an HARQ period corresponding to 8 subframes.

In frequency division duplex (FDD) of 3GPP LTE, 8 HARQ processes can be performed, and the respective HARQ processes are indexed from 0 to 7. The above example shows that HARQ is performed at an HARQ process index 4.

Figure 4:
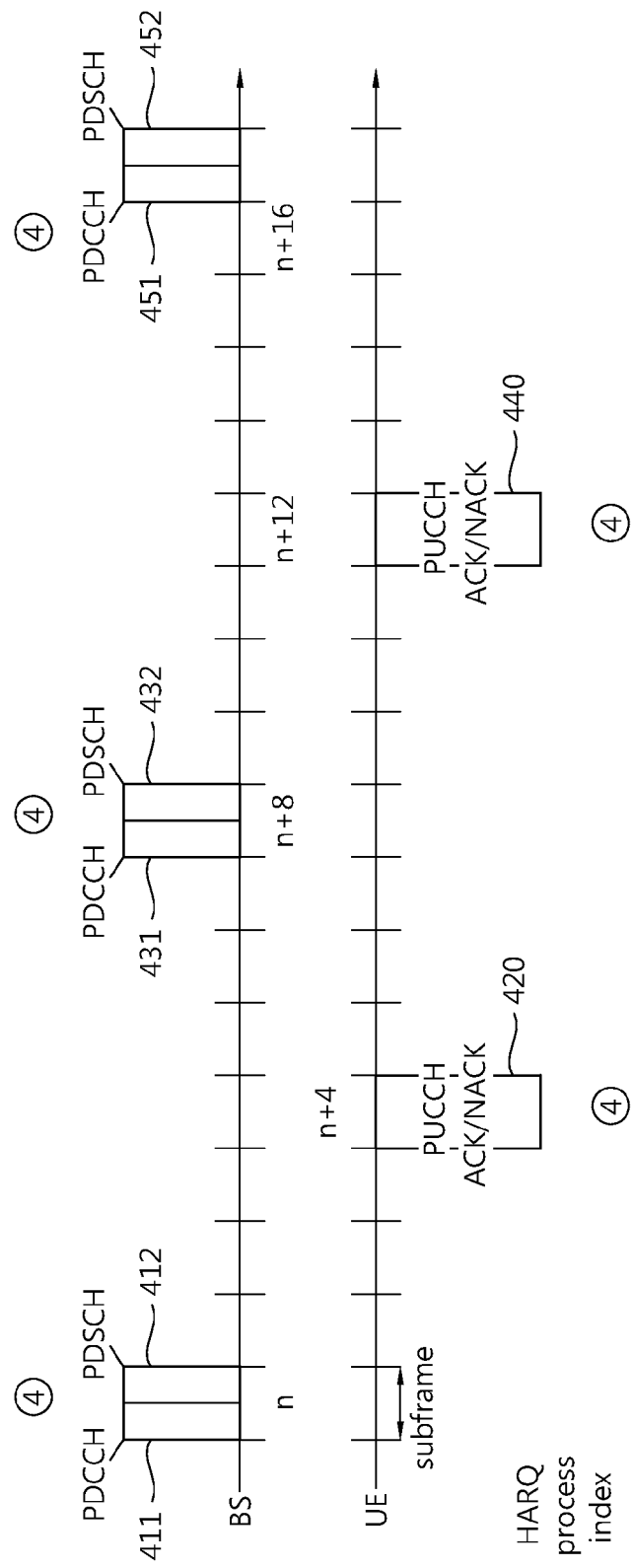
FIG. 4 shows downlink asynchronous HARQ in 3GPP LTE.

FIG. 4 shows DL asynchronous HARQ in 3GPP LTE.

A BS transmits a DL transport block to a UE on a PDSCH 412 indicated by a DL resource allocation on a PDCCH 411 in an n$^{th}$ subframe.

The UE sends an ACK/NACK signal on a PUCCH 420 in an (n+4)$^{th}$ subframe. For example, a resource of the PUCCH 420 used in transmission of the ACK/NACK signal is determined based on a resource of the PDCCH 411 (e.g., an index of a first CCE used in transmission of the PDCCH 411).

Even if the NACK signal is received from the UE, the BS does not necessarily perform retransmission in an (n+8)$^{th}$ subframe unlike in the UL HARQ. Herein, a retransmission block is transmitted on a PDSCH 432 indicated by a DL resource allocation on a PDCCH 431 in an (n+9)$^{th}$ subframe.

The UE sends an ACK/NACK signal on a PUCCH 440 in an (n+13)$^{th}$ subframe.

As such, according to asynchronous HARQ, the BS does not necessarily perform retransmission in a predetermined period even if a retransmission request of the UE is received.

Figure 5:
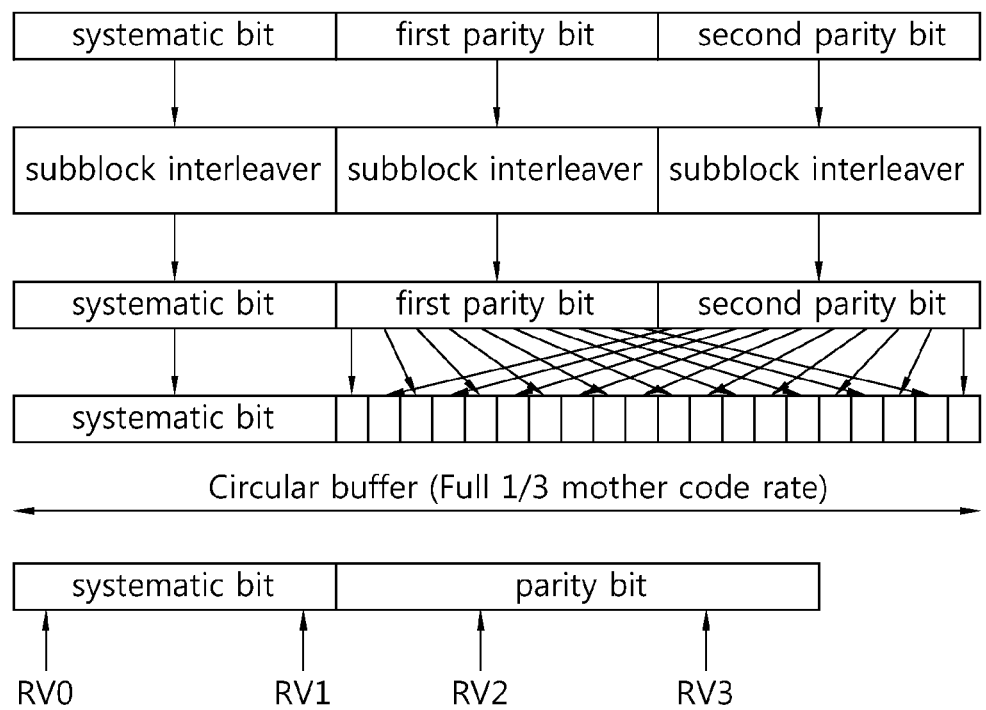
FIG. 5 shows an example of channel coding in 3GPP LTE.

FIG. 5 shows an example of channel coding in 3GPP LTE. The section 5.1 of 3GPP TS 36.212 V8.5.0 (2008-12) may be incorporated herein by reference.

Data and control signals from/to a media access control (MAC) layer may be encoded to provide a transmission and control service through a wireless communication link. This is called channel coding, and may include a combination of error detection, error correction, rate matching, interleaving, etc.

A transport block may be divided into coded blocks after a cyclic redundancy check (CRC) is attached thereto, and then may be subjected to a process of channel coding and rate matching.

A code block consists of systematic bits, first parity bits, and second parity bits. The code block is interleaved by using a subblock interleaver. The interleaved code block is stored in a circular buffer having a length $K_w$. In this case, a size of the circular buffer may be regulated according to a buffer size of a UE. The code block is rate-matched according to a size of a receive buffer of the UE.

In 3GPP LTE, an incremental redundancy (IR)-type HARQ is used, and thus a redundancy version (RV) varies in each retransmission. An initial position in a buffer for retransmission is defined according to the RV.

In addition, a receive buffer size varies depending on capability of the UE. This is to limit the receive buffer size according to the UE capability since the increase in the receive buffer size may result in the increase in manufacturing costs of the UE. A last part of a mother code may be truncated due to the limitation of the receive buffer. This is called limited buffer rate matching (LBRM).

The receive buffer is also referred to as a soft buffer, and is a logical/physical buffer allocated for each HARQ process.

Conventionally, a soft buffer size $N_{IR}$ for a transport block in 3GPP LTE is defined by Equation 1 below.

$$N_{IR} = \text{floor}\left(\frac{N_{soft}}{K_{MIMO} \cdot \min(M_{HARQ}, M_{limit})}\right) \quad \text{[Equation 1]}$$

In Equation 1, floor(x) is a function that returns a greatest integer equal to or less than x, and min(x,y) is a function that returns a smaller value between x and y. $N_{soft}$ denotes the total number of soft channel bits, and is defined depending on the UE capability. $N_{soft}$ may have one value selected from a set of {250368, 1237248, 1827072, 3667200}. $K_{MIMO}$ denotes a value determined depending on the use of spatial multiplexing. $K_{MIMO}$ is 2 if the spatial multiplexing is used. Otherwise, $K_{MIMO}$ is 1. $M_{limit}$ is a constant equal to 8. $M_{HARQ}$ denotes the maximum number of HARQ processes. As shown in Equation 1, since only one carrier is considered in LTE, the number of HARQ processes for each carrier is not considered. Therefore, it may be difficult to directly use Equation 1 to a system supporting multiple carriers such as LTE-A.

<Downlink Transmission Mode>

A downlink transmission mode can be classified into 9 types described below.

Transmission mode 1: Single antenna port, port 0.

Transmission mode 2: Transmit diversity.

Transmission mode 3: Open loop spatial multiplexing: It is an open loop mode in which a rank adaptation based on RI feedback is possible. If a rank is 1, the transmit diversity may be applied. If the rank is greater than 1, a large delay CDD may be used.

Transmission mode 4: Closed loop spatial multiplexing or transmission diversity.

Transmission mode 5: Transmit diversity or multi-user MIMO.

Transmission mode 6: Transmit diversity or closed loop spatial multiplexing having single transmission layer.

Transmission mode 7: Single antenna port (port 0) is used when the number of PBCH antenna ports is 1, and otherwise, transmit diversity is used. Alternatively, single antenna port transmission (port 5) is performed.

Transmission mode 8: Single antenna port (port 0) is used when the number of PBCH antenna ports is 1, and otherwise, transmit diversity is used. Alternatively, dual layer transmission is performed using antenna ports 7 and 8, or single antenna port transmission is performed by using the port 7 or the port 8.

Transmission mode 9: Up to 8 layer transmission (ports 7 to 14).

In case of not an MBSFN subframe, if the number of PBCH antenna ports is 1, single antenna port transmission (port 0) is used, and otherwise transmit diversity is used. In case of the MBSFN subframe, single antenna port transmission (port 7) is performed.

Transmission mode 10: Up to 8 layer transmission (ports 7 to 14).

In case of not the MBSFN subframe, if the number of PBCH antenna ports is 1, single antenna port transmission (port 0) is used, and otherwise transmit diversity is used. In case of the MBSFN subframe, single antenna port transmission (port 7) is performed. CSI measurement in which zero-power CSI-RS (Channel State Information-Reference Signal) is configured and used may be performed, and an operation of cooperative multi-point transmission and reception operation may be supported by signaling a PQI (PDSCH RE Mapping and Quasi-Co-Location Indicator).

<Multiple Carrier System>

Now, a multiple carrier system (or a carrier aggregation system) will be described.

The 3GPP LTE system supports a case where a DL bandwidth and a UL bandwidth are set differently under the premise that one CC is used. This implies that the 3GPP LTE is supported only for a case where the DL bandwidth and the UL bandwidth are equal to or different from each other in a situation where one CC is defined for each of a DL and a UL. For example, the 3GPP LTE may support up to 20 MHz, and supports only one CC for the UL and the DL even if the UL bandwidth and the DL bandwidth may be different from each other.

Spectrum aggregation (also referred to as bandwidth aggregation or carrier aggregation) is for supporting a plurality of CCs. The spectrum aggregation is introduced to support an increasing throughput, to prevent cost rising caused by introduction of a broadband radio frequency (RF) device, and to ensure compatibility with a legacy system. For example, when 5 CCs are assigned with a granularity of a carrier unit having a bandwidth of 20 MHz, a bandwidth of up to 100 MHz can be supported.

The spectrum aggregation can be classified into contiguous spectrum aggregation achieved between consecutive carriers in a frequency domain and non-contiguous spectrum aggregation achieved between discontinuous carriers. The number of aggregated CCs may be set differently between the DL and the UL. Symmetric aggregation is achieved when the number of DL CCs is equal to the number of UL CCs. Asymmetric aggregation is achieved when the number of DL CCs is different from the number of UL CCs.

The CCs may have different sizes (i.e., bandwidths). For example, if 5 CCs are used to configure a 70 MHz band, it can be configured such as 5 MHz CC(carrier #0)+20 MHz CC(carrier #1)+20 MHz CC(carrier #2)+20 MHz CC(carrier #3)+5 MHz CC(Carrier #4).

Hereinafter, a multiple carrier system implies a system supporting multiple carriers on the basis of spectrum aggregation. The multiple carrier system can use contiguous spectrum aggregation and/or non-contiguous spectrum aggregation, and also can use either symmetric aggregation or asymmetric aggregation.

Cross-carrier scheduling is possible between multiple carriers. That is, a PDSCH of the CC #2 may be indicated using a DL grant (or a UL grant) of a PDCCH of the CC #1. In this case, a carrier on which the PDCCH is transmitted is referred to as a reference carrier or a primary carrier. A carrier on which a PDSCH is transmitted is referred to a secondary carrier.

Meanwhile, a term 'cell' is used in LTE-A, and a CC and the cell are in association with each other. For example, the cell may imply a pair of DL CC and a UL CC. Alternatively, the cell may also imply a combination of a DL CC and an optional UL CC.

In order to transmit and receive a transport block through a specific cell, the UE first has to complete configuration of the specific cell. Herein, the configuration implies a state of completely receiving system information required for data transmission and reception for the cell. For example, the configuration may include an overall procedure for receiving common physical layer parameters necessary for data transmission and reception, MAC layer parameters, or parameters necessary for a specific operation in an RRC layer.

The cell in a state of completing its configuration can exist in an activation or deactivation state. Herein, the activation implies that data transmission or reception is performed or is in a ready state. The UE can monitor or receive a control channel (i.e., PDCCH) and a data channel (i.e., PDSCH) of an activated cell in order to confirm a resource (e.g., frequency, time, etc.) allocated to the UE.

The deactivation implies that data transmission or reception is impossible and measurement or transmission/reception of minimum information is possible. On the other hand, in order to confirm the resource (e.g., frequency, time, etc.) allocated to the UE, the UE does not monitor or receive a control channel (i.e., PDCCH) and a data channel (i.e., PDSCH) of the deactivated cell.

A cell can be classified into a primary cell, a secondary cell, and a serving cell.

The primary cell implies a cell that operates at a primary frequency. Further, the primary cell implies a cell in which the UE performs an initial connection establishment procedure or a connection re-establishment procedure with respect to the BS or a cell indicated as the primary cell in a handover procedure.

The secondary cell implies a cell that operates at a secondary frequency. Once an RRC connection is established, the secondary cell is used to provide an additional radio resource.

The serving cell is configured with the primary cell in case of a UE of which carrier aggregation is not configured or which cannot provide the carrier aggregation. If the carrier aggregation is configured, the term 'serving cell' is used to indicate a set consisting of one or a plurality of cells among primary cells or all secondary cells.

A set of serving cells assigned to only one UE may consist of only one primary cell, or may consist of one primary cell and at least one secondary cell.

A primary component carrier (PCC) denotes a CC corresponding to the primary cell. The PCC is a CC that establishes an initial connection (or RRC connection) with the BS among several CCs. The PCC serves for a connection (or RRC connection) for signaling related to a plurality of CCs, and is a CC that manages UE context which is connection information related to the UE. In addition, the PCC establishes a connection with the UE, and thus always exists in an activation state when in an RRC connected mode. A DL CC corresponding to the primary cell is called a DL primary component carrier (DL PCC), and a UL CC corresponding to the primary cell is called a UL primary component carrier (UL PCC).

A secondary component carrier (SCC) implies a CC corresponding to the secondary cell. The SCC is a CC allocated to the UE in addition to the PCC. The SCC is an extended carrier used by the UE for additional resource allocation or the like in addition to the PCC, and can operate either in an activation state or a deactivation state. A DL CC corresponding to the secondary cell is called a DL secondary CC (DL SCC), and a UL CC corresponding to the secondary cell is called a UL secondary CC (UL SCC).

The primary cell and the secondary cell have the following features.

First, the primary cell is used for PUCCH transmission. Second, the primary cell is always activated, whereas the secondary cell relates to a carrier which is activated/deactivated according to a specific condition. Third, when the primary cell experiences a radio link failure (RLF), RRC re-connection is triggered, whereas when the secondary cell experiences the RLF, the RRC re-connection is not triggered. Fourth, the primary cell can change by a handover procedure accompanied by a random access channel (RACH) procedure or security key modification. Fifth, non-access stratum (NAS) information is received through the primary cell. Sixth, the primary cell always consists of a pair of a DL PCC and a UL PCC. Seventh, for each UE, a different CC can be configured as the primary cell. Eighth, a procedure such as reconfiguration, adding, and removal of the primary cell can be performed by an RRC layer. When adding a new secondary cell, RRC signaling can be used for transmission of system information of a dedicated secondary cell.

Regarding a CC constructing a serving cell, a DL CC can construct one serving cell, or the DL CC can be connected to a UL CC to construct one serving cell. However, the serving cell is not constructed only with one UL CC.

Activation/deactivation of a CC is equivalent in concept to activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

Figure 6:
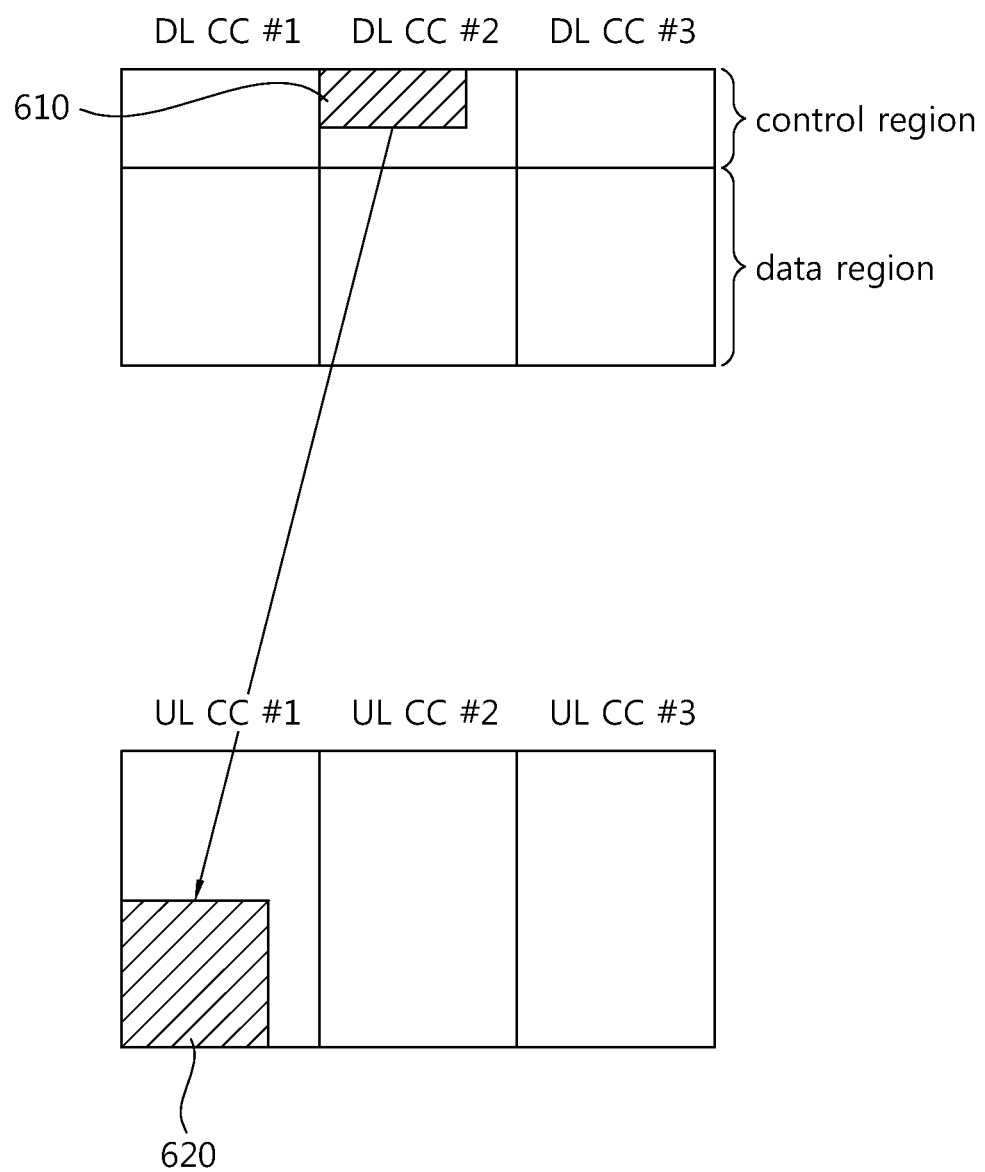
FIG. 6 shows an exemplary operation of a multiple carrier system.

FIG. 6 shows an exemplary operation of a multiple carrier system.

Referring to FIG. 6, a PDCCH 610 of a DL CC #2 transmits a resource allocation for a PUSCH 620 of a UL CC #1. Although three DL CCs and three UL CCs are shown FIG. 6, the number of DL CCs and the number of UL CCs are not limited thereto.

Meanwhile, a DL grant or a UL grant transmitted in a multiple carrier system may include at least any one of a new data indicator (NDI), an HARQ process indicator, and a carrier index (CI) shown in Table 2 below.

TABLE 2

| Field | Number of bits | Description |
| --- | --- | --- |
| NDI (new data indicator) | 1 | toggle whether it is initial transmission or retransmission |
| HARQ process indicator | 3 (FDD), 4 (TDD) | indicate index of HARQ process |
| CI (carrier index) | 3 | index of CC using DL grant or UL grant |

In FDD, up to 8 HARQ processes can be used in one CC, and thus an HARQ process indicator may be 3 bits. Meanwhile, in TDD, since up to 15 HARQ processes can be used in one CC according to a UL/DL configuration, the HARQ process indicator may be 4 bits.

Table 3 below shows the maximum number $M_{DL\_HARQ}$ of DL HARQ processes in TDD/FDD.

TABLE 3

| TDD UL/DL configuration | Maximum number of HARQ processes |
| --- | --- |
| 0 | 4 |
| 1 | 7 |
| 2 | 10 |
| 3 | 9 |
| 4 | 12 |
| 5 | 15 |
| 6 | 6 |
| FDD | 8 |

Meanwhile, a future wireless communication system considers an aggregation between CCs having the same or different radio frame structures, an aggregation between CCs having the same or different TDD UL-DL configurations, an aggregation of various cells, etc. In this case, a plurality of CCs (or cells) may be used, and when each CC transmits a transport block, the number of processes may be increased along with an increase in the number of CCs. For example, when one CC which operates in FDD uses 8 HARQ processes, a system supporting 3 CCs which operate in FDD may have 24 HARQ processes.

First, a method of determining a soft buffer size in a transmission end will be described when a plurality of cells are aggregated to a UE similarly to 3GPP LTE-A and the aggregated cells have the same number of DL HARQ processes.

A cyclic buffer length $K_w$ for an r-th code block is $3K_\Pi$, and may be generated by Equation 2 below.

$$w_k = v_k^{(0)} \text{ for } k=0, \ldots, K_\Pi - 1$$

$$w_{K_\Pi + 2k} = v_k^{(1)} \text{ for } k=0, \ldots, K_\Pi - 1$$

$$w_{K_\Pi + 2k+1} = v_k^{(2)} \text{ for } k=0, \ldots, K_\Pi - 1$$

In Equation 2, $v_k^{(0)}$, $v_k^{(1)}$, and $v_k^{(2)}$ denote outputs of a sub-block interleaver.

A soft buffer size for a transport block is denoted by $N_{IR}$ bits, and a soft buffer size for the r-th code block is denoted by $N_{cb}$ bits. Then, $N_{cb}$ is acquired by Equation 3 below.

[Equation 3]

$$N_{cb} = \min\left(\left\lfloor \frac{N_{IR}}{C} \right\rfloor, K_w\right) \text{ for } DL\text{-}SCH \text{ and } PCH \text{ transport channels}$$

$$N_{cb} = K_w \text{ for } UL\text{-}SCH \text{ and } MCH \text{ transport channels}$$

In Equation 3, C denotes the number of code blocks, and $N_{IR}$ is as follows.

$$N_{IR} = \left\lfloor \frac{N_{soft}}{K_C \cdot K_{MIMO} \cdot \min(M_{DL\_HarQ,c}, M_{limit})} \right\rfloor \quad [\text{Equation 4}]$$

In Equation 4, if a UE signals 'ue-Category-v10xy', and is configured with a transmission mode 0 for a DL cell, $N_{soft}$ is the total number of soft channel bits according to a UE category indicated by 'ue-Category-v10xy'. Otherwise, $N_{soft}$ is the total number of soft channel bits according to a UE category indicated by 'ue-Category'. Herein, 'ue-Category-v10xy' and 'ue-category' are fields for defining a UL and DL capability, and may define, for example, the maximum number of DL-SCH transport block bits that can be received in one TTI, the total number of soft channel bits, the maximum number of layers supported for spatial multiplexing in DL, etc.

If $N_{soft}$ is '35982720', then $K_C$ is 5. Otherwise, if $N_{soft}$ is '3654144' and the UE supports only up to two spatial layers for the DL cell, then $K_C$ is 2. Otherwise, $K_C$ is 1.

If the UE is configured to receive a PDSCH on the basis of a transmission mode 3, 4, 8, or 9, then $K_{MIMO}$ is 2, and otherwise, $K_{MIMO}$ is 1. $M_{DL\_HARQ,c}$ denotes the maximum number of DL HARQ processes for a serving cell c. $M_{limit}$ is a constant equal to 8.

Meanwhile, with respect to a code block (CB) having C divided transport blocks (TBs), a soft buffer size $N_{IR}$ for a TB in a receiving end is defined by Equation 5 below as a soft buffer size for each CB.

$$n_{SB} = \min\left(N_{cb}, \left\lfloor \frac{N'_{soft}}{C \cdot N^{DL}_{cells} \cdot K_{MIMO} \cdot \min(M_{DL\_HARQ,c}, M_{limit})} \right\rfloor\right) \quad [\text{Equation 5}]$$

C denotes the number of code blocks, and $N_{cb}$ is based on Equation 3. If the UE is configured to receive the PDSCH on the basis of the transmission mode 3, 4, 8, or 9, then $K_{MIMO}$ is 2, and otherwise, $K_{MIMO}$ is 1. $M_{DL\_HARQ,c}$ denotes the maximum number of DL HARQ processes for a serving cell c. $M_{limit}$ is a constant equal to 8. $N^{DL}_{cells}$ denotes the number of configured serving cells. If 'ue-Category-v10xy' is signaled by the UE, $N'_{soft}$ is the total number of soft channel bits based on a UE category indicated by 'ue-Category-v10xy'. Otherwise, $N'_{soft}$ is the total number of soft channel bits based on a UE category indicated by 'ue-Category'. In determining k, the UE must give priority to storing of soft channel bits corresponding to lower values of k. $w_k$ corresponds to a received soft channel bit, and a range of $w_k$ $w_{k+1}, \ldots, w_{mod(k+nSB-1,Ncb)}$ may include a sub-set not included in the received soft channel bits.

The soft buffer size $n_{SB}$ per code block shown in Equation 5 is a number which is set to equally distribute a soft buffer size $N_{IR}$ for a transport block (TB) to each code block. That is, the soft buffer size $n_{SB}$ per code block may be a result of distribution for each code block, after all soft buffers are distributed with a soft buffer size for a TB of the receiving end according to the number of CCs configured to the UE and the maximum number of effective HARQ processes for each CC. Both for FDD and TDD, if the UE is configured with more than one serving cell, then for each serving cell, for at least $K_{MIMO} \cdot \min(M_{DL\_HARQ,c}, M_{limit})$ transport blocks, and for a decoding failure of one code block of one TB, the UE stores soft channel bits corresponding to a range of at least $w_k\ w_{k+1}, \ldots, w_{mod(k+nSB-1,Ncb)}$.

The maximum number of HARQ processes is important because of a limited soft buffer size of the UE. This is because, since the soft buffer size of the UE is limited, a size of an available buffer for storing a soft channel bit for each HARQ process is decreased along with an increase in the maximum number of HARQ processes, which may result in a decrease in channel coding capability.

However, as explained in Equation 5, $N^{DL}_{cells}$ is the number of configured serving cells. Therefore, even if the configured serving cell is not in an activation state, it has an effect on the soft buffer size per code block, and thus soft buffer division and allocation may be not effective.

Hereinafter, the present invention will be described. For this, the following parameters are defined.

$N_{CC}$: the total number of CCs that can be used by the UE $M_{sc}$: the maximum number of HARQ processes when a single CC is used $M_x$: the maximum number of effective HARQ processes in an $x^{th}$ CC $M_{all}$: the maximum number of effective HARQ processes for Ncc CCs v: an HARQ process index given by using a DL grant of a PDCCH or signaling in a transmitter. This is called an HARQ indication index.

p: an index of HARQ process used for each CC. This is called an HARQ effective index.

The maximum number of effective HARQ processes implies the maximum number of HARQ processes not exceeding a limit of the soft buffer. It may imply the number of HARQ processes not exceeding the maximum value of the soft buffer division of the UE. It may correspond to $\min(M_{HARQ,c}, M_{limit})$ with respect to one CC.

In a multiple carrier system, a soft buffer size $n_{SB}$ of a transport block may be determined on the basis of $M_{all}$. For example, the soft buffer size may be defined to be in inverse proportion to $M_{all}$. In this case, $M_{all} \leq (M_{sc} \cdot N_{CC})$.

Therefore, the multiple carrier system of the present invention may define the soft buffer size $n_{SB}$ for the transport block as shown in Equation 6.

$$n_{SB} = \min\left(N_{cb}, \left\lfloor \frac{N'_{soft}}{C \cdot K_{MIMO} \cdot \min(M_{all}, N_{CC}M_{limit})} \right\rfloor\right)$$ [Equation 6]

In Equation 6, $N'_{soft}$ is the total number of soft channel bits, and is determined according to UE capability. $K_{MIMO}$ is a value determined by the use of spatial multiplexing, and is equal to the maximum number of transport blocks that can be transmitted using the spatial multiplexing. For example, if two transport blocks can be transmitted simultaneously through multiple antennas, it is set to $K_{MIMO}=2$, and otherwise if only one transport block can be transmitted, it is set to $K_{MIMO}=1$. $M_{limit}$ is a constant, and may be equal to $M_{sc}$.

The UE may manage an HARQ process by utilizing a soft buffer having a size greater than or equal to the aforementioned soft buffer size per code block (i.e., a soft buffer size for each transport block determined by the soft buffer size per code block).

<HARQ Process Sharing Across CCs>

In order to increase a soft buffer size for a transport block, it may be necessary to decrease the maximum number of effective HARQ processes across all CCs. That is, it is preferably set to $M_{all} < (M_{sc} \cdot N_{CC})$. That is, a soft buffer may be used by being divided on the basis of $M_{all}$ as shown in Equation 6.

Meanwhile, although not an optimized division of the soft buffer, a method of sharing an HARQ process by simplifying a division scheme as shown in Equation 5 may be applied.

It is exemplified hereinafter that $N_{CC}=4$, $M_{sc}=8$, $M_{all}=20$, or $M_{all}=23$ for example. However, the technical features of the present invention are not limited thereto.

Figure 7:
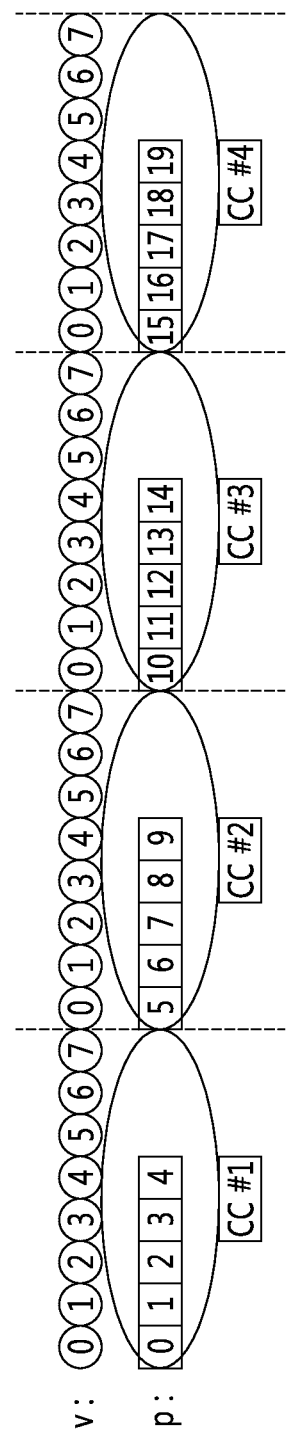
FIG. 7 shows a method of managing a hybrid automatic repeat request (HARQ) process according to a first embodiment of the present invention.

FIG. 7 shows a method of managing an HARQ process according to a first embodiment of the present invention. In FIG. 7, a number inside a circle denotes an HARQ indication index v, and a number inside a square denotes an HARQ effective index p (the same is also true in the drawings described below).

Referring to FIG. 7, the HARQ indication index v for each CC indicates 0 to 7, and 5 effective HARQ processes are allocated for each CC. The effective HARQ process is an HARQ process that can be actually allocated to each CC, and has an HARQ effective index. Since $N_{CC}=4$, the maximum number of effective HARQ processes is $M_{all}=M_x \cdot N_{CC}=20$, and is numbered with an HARQ effective index in the range of 0 to 19.

If $M_{all}$ is a multiple of $N_{CC}$, the number of effective HARQ processes of each CC is $M_x=M_{all}/N_{CC}$. If $M_{all}$ is not the multiple of $N_{CC}$, the number of effective HARQ processes of each CC is $M_x=\text{round}(M_{all}/N_{CC})$. Herein, round(x) is a function which returns a rounded value of x.

Since $M_{all}=20$ and $N_{CC}=4$ in the above example, it is set to $M_1=5$, $M_2=5$, $M_3=5$, $M_4=5$.

If a UE receives $M_{all}=20$ from a BS, since its available CC is 4, 5 effective HARQ processes are allocated for each CC.

$M_{all}$ may be reported by the BS to the UE through a higher layer message such as an RRC message.

Figure 8:
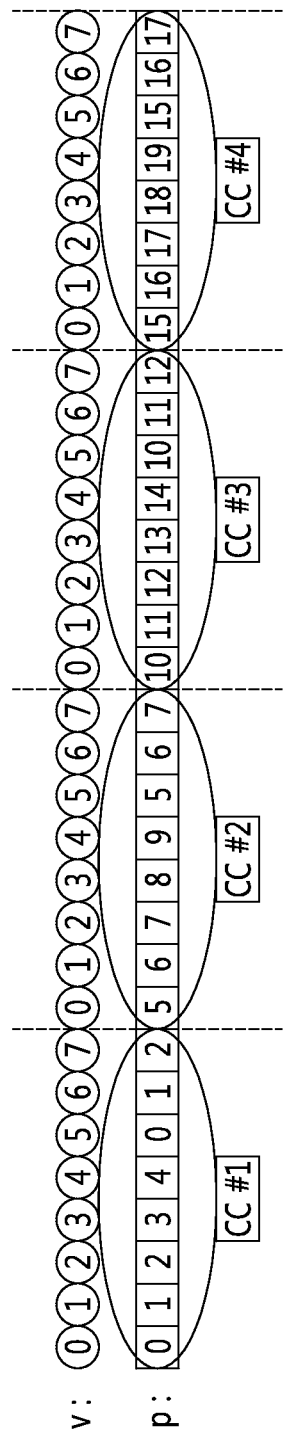
FIG. 8 shows a method of managing an HARQ process according to a second embodiment of the present invention.

FIG. 8 shows a method of managing an HARQ process according to a second embodiment of the present invention. Whereas an HARQ indication index which is not mapped to an HARQ effective index exists for each CC in the first exemplary embodiment, it is shown in the second embodiment that the same HARQ effective index can be indicated with different HARQ indication indices. For example, in a CC #1, an HARQ effective index 0 may be indicated by overlapping with an HARQ indication index 0 or 5.

If the same effective HARQ process is specified with different HARQ indication indices, an old buffer may be flushed and a new HARQ process may start. Even if it is indicated in an overlapping manner, the effective HARQ process operates separately.

Alternatively, if the same effective HARQ process is specified with different HARQ indication indices, a previously operated HARQ process may be directly performed. That is, it is recognized as the same HARQ process.

Figure 9:
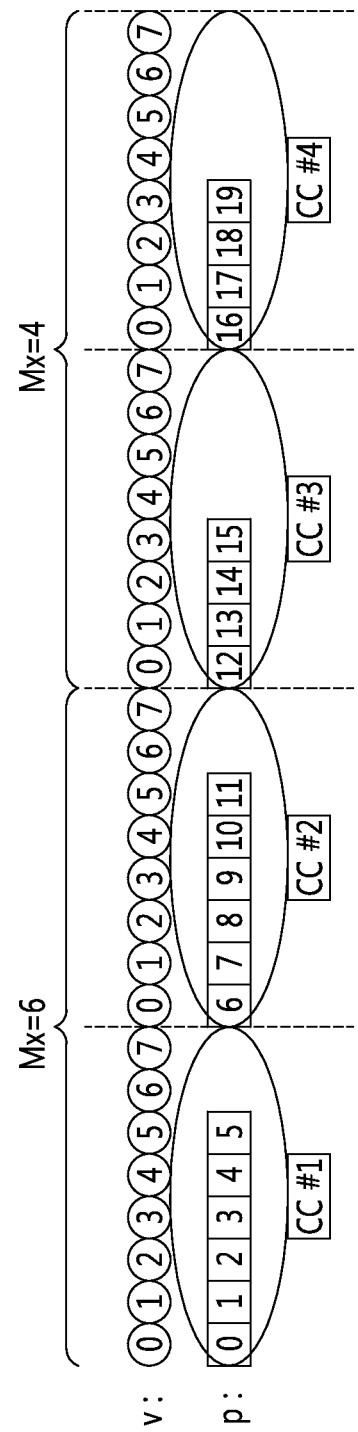
FIG. 9 shows a method of managing an HARQ process according to a third embodiment of the present invention.

FIG. 9 shows a method of managing an HARQ process according to a third embodiment of the present invention. In comparison with the first embodiment, it is shown that the maximum number of effective HARQ processes may vary in unit of a CC set or a CC.

For example, 6 effective HARQ processes are allocated by grouping a CC #1 and a CC #2 to a first set, and 4 effective HARQ processes may be allocated by grouping a CC #3 and a CC #4 to a second set. In this case, it is set to $M_1=M_2=6$, $M_3=M_4=4$.

In this case, the maximum number M of all effective HARQ processes may be indicated by Equation 7 below.

$$M_{all} = \sum_{x=1}^{N_{CC}} M_x = \sum_{i=1}^{N_{set}} M_{set,i} N_{set,i}$$ [Equation 7]

In Equation 7, $N_{set}$ denotes the number of CC sets, $M_{set,i}$ denotes the number of effective HARQ processes for each CC in an $i^{th}$ CC set, and $N_{set,i}$ denotes the number of CCs in the $i^{th}$ CC set.

Figure 10:
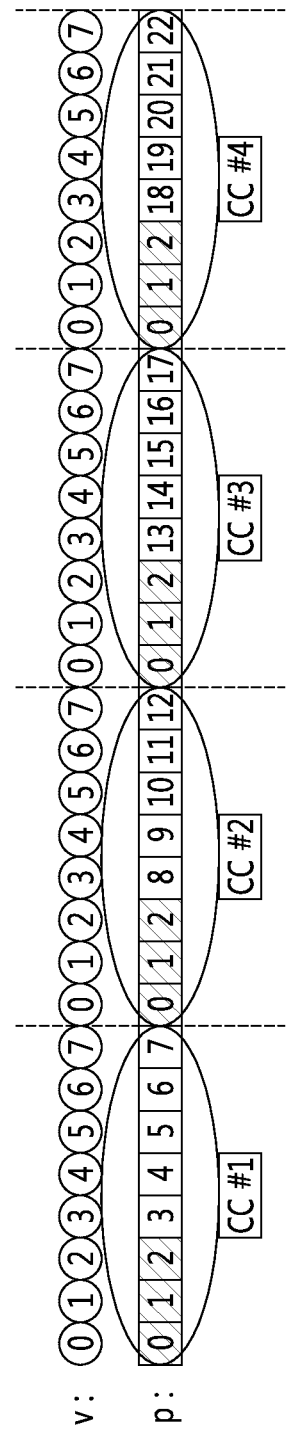
FIG. 10 shows a method of managing an HARQ process according to a fourth embodiment of the present invention.

FIG. 10 shows a method of managing an HARQ process according to a fourth embodiment of the present invention.

Referring to FIG. 10, an HARQ indication index v indicates 0 to 7 for each CC. An effective HARQ process of which an HARQ effective index is {0, 1, 2} is shared by all CCs. A shared (or overlapping) effective HARQ process is called a shared HARQ process. The number of shared HARQ processes is denoted by $M_{overlap}$. Herein, the HARQ effective index {0, 1, 2} is for exemplary purposes only, not for restrictive purposes.

Among 23 effective HARQ processes, 3 of them may be shared HARQ processes, and the remaining effective HARQ processes may be equally allocated for each CC. Since the number of the remaining effective HARQ processes other than the shared HARQ process is 20 and $N_{CC}=4$, 5 effective HARQ processes may be allocated for each CC. Eventually, 3 shared HARQ processes and 5 effective HARQ processes are allocated for each CC, and thus 8 HARQ indication indices are mapped to each CC.

The maximum number of all effective HARQ processes is $M_{all}=(M_{sc}-M_{overlap})N_{CC}+M_{overlap}$. Herein, $M_{all}=23$. The following relation may be satisfied between the HARQ indication index v and the HARQ effective index p. If $0 \leq v \leq M_{overlap}-1$, then p=v. Otherwise, $p=v+(n'_{CC}-1)(Msc-M_{overlap})$. Herein, $n'_{CC}$ is a CC index from 1 to $N_{CC}$. The aforementioned relation is expressed differently as follows. If $0 \leq v \leq M_{overlap}-1$, then p=v. Otherwise, $p=v+(n'_{CC}-1)(Msc-M_{overlap})$. Herein, $n'_{CC}$ is a CC index from 0 to $N_{CC}-1$.

Figure 11:
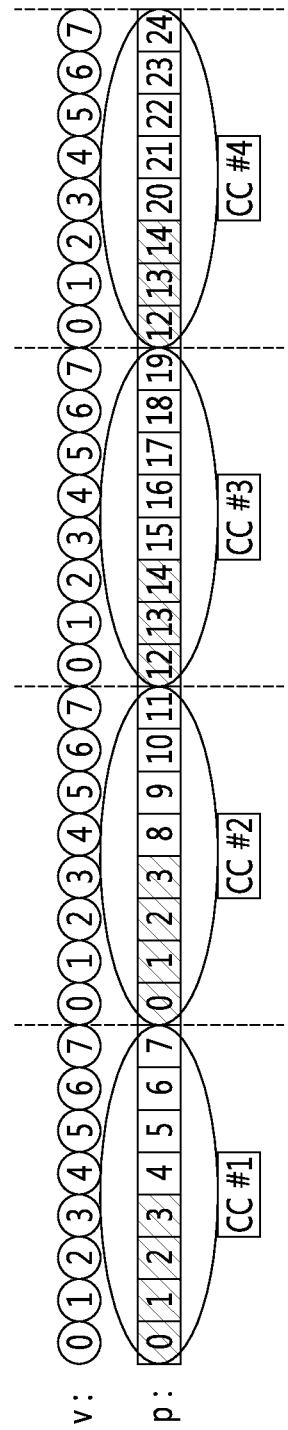
FIG. 11 shows a method of managing an HARQ process according to a fifth embodiment of the present invention.

FIG. 11 shows a method of managing an HARQ process according to a fifth embodiment of the present invention. In comparison with the fourth embodiment of FIG. 10, it is shown that the number of shared HARQ processes may vary in unit of a CC set or a CC.

For example, four shared HARQ processes {0, 1, 2, 3} are allocated by grouping a CC #1 and a CC #2 to a first set. Three effective HARQ processes {12, 13, 14} are allocated by grouping a CC #3 and a CC #4 to a second set. The remaining effective processes {4, 5, 6, 7, 8, 9, 10, 11, 15, 16, 17, 18, 19, 20, 21, 22, 23, 24} may also be allocated equally or unequally for each set. It is shown in FIG. 11 that 4 effective HARQ processes are allocated to each of the CC #1 and CC #2 belonging to the first set, and 5 effective HARQ processes are allocated to each of the CC #3 and CC #4 belonging to the second set.

In this case, the maximum number of all effective HARQ processes may be indicated by Equation 8 below.

$$M_{all} = \sum_{x=1}^{N_{CC}} M_x = \sum_{i=1}^{N_{set}} \{(M_{sc} - M_{overlap,i})N_{set,i} + M_{overlap,i}\}$$ [Equation 8]

Herein, $N_{set}$ denotes the number of CC sets, $N_{set,i}$ denotes the number of CCs in an $i^{th}$ CC set, and $M_{overlap,i}$ denotes the number of HARQ processes shared in the $i^{th}$ CC set.

Figure 12:
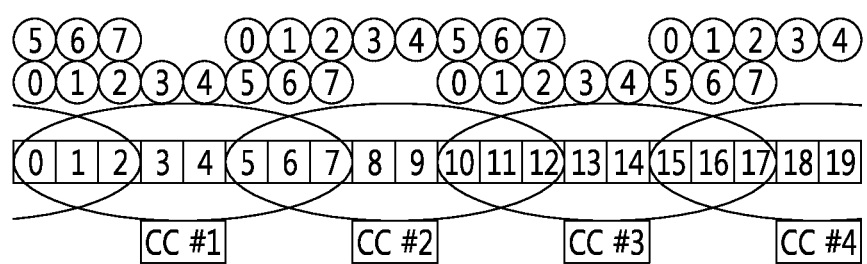
FIG. 12 shows a method of managing an HARQ process according to a sixth embodiment of the present invention.

FIG. 12 shows a method of managing an HARQ process according to a sixth embodiment of the present invention.

Referring to FIG. 12, each CC has up to 8 effective HARQ processes. Each CC shares a neighboring CC and an effective HARQ process. For example, a CC #1 shares an effective HARQ process of {0,1,2} with a CC #4, and shares an effective HARQ process of {5,6,7} with a CC #2.

Each CC may have one or more dedicated effective HARQ processes not used by other CCs. For example, when the HARQ indication index is {3,4}, the CC #1 has a dedicated effective HARQ process of {3,4}, the CC #2 has a dedicated effective HARQ process of {8,9}, a CC #3 has a dedicated effective HARQ process of {13,14}, and the CC #4 has a dedicated effective HARQ process of {18,19}.

The maximum number of all effective HARQ processes may be defined as $M_{all}=(M_{sc}-M_{overlap})\cdot N_{CC}$. Herein, $M_{overlap}$ is the number of effective HARQ processes shared with one neighboring CC. Since $M_{sc}=8$, $M_{overlap}=3$, $N_{CC}=4$, then $M_{all}=20$.

Figure 13:
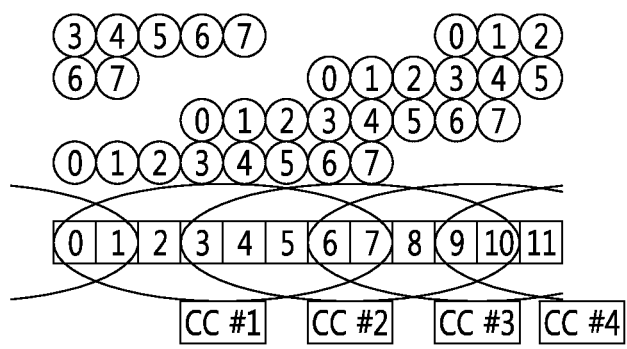
FIG. 13 shows a method of managing an HARQ process according to a seventh embodiment of the present invention.

FIG. 13 shows a method of managing an HARQ process according to a seventh embodiment of the present invention.

Referring to FIG. 13, it is shown that effective HARQ processes can be shared by a plurality of CCs in order to decrease the maximum number of all effective HARQ processes. For example, it is exemplified that, among effective processes {0,1,2,3,4,5,6,7} of a CC #1, {3,4,5,6,7} are shared by a CC #2, {6,7} are shared by a CC #3, and {0,1} are shared by a CC #4.

The maximum number of all effective HARQ processes is $M_{all}=12$.

A relation of $p=\{v+(n_{CC}-1)(M_{sc} M_{overlap})\} \mod M_{all}$ may be satisfied between an HARQ indication index v and an HARQ effective index p. Herein, $n_{CC}$ is a CC index from 1 to $N_{CC}$.

Alternatively, $p=\{v+(n_{CC}-1)(M_{sc} M_{overlap})\} \mod M_{all}$. Herein, $n'_{CC}$ is a CC index from 0 to $N_{CC}-1$.

A method of sharing an effective HARQ process enables mapping of a flexible HARQ process between CCs. A transport block transmitted initially by using a shared HARQ process via a $1^{st}$ CC may be retransmitted via a $2^{nd}$ CC by using the same HARQ process.

If $M_{all}<(M_{sc}\cdot N_{CC})$, the HARQ process may be shared between neighboring CCs. If the same HARQ process can be continuously performed between CCs, a CC used in initial transmission and a CC used in retransmission may be configured differently in the same HARQ process, and thus a frequency diversity gain can be obtained.

A BS can schedule the effective HARQ process to each CC in a situation where a soft buffer size of a UE is limited. In addition, the same HARQ process may be allocated between different CCs.

Meanwhile, if a shared HARQ process is shared between a plurality of CCs, a collision of the HARQ process may occur. The collision of HARQ implies that one HARQ process is used for HARQ of different transport blocks by a plurality of CCs. Various methods may be used to avoid the collision of HARQ.

For example, a $1^{st}$ transport block is transmitted in a $1^{st}$ CC by using the shared HARQ process. In this case, in a $2^{nd}$ CC which shares the shared HARQ process with the $1^{st}$ CC, it may be restricted that scheduling of a $2^{nd}$ transport block starts after finishing successful transmission of the $1^{st}$ transport block.

For another example, the $1^{st}$ transport block is transmitted initially in the $1^{st}$ CC by using the shared HARQ process. In this case, in the $2^{nd}$ CC which shares the shared HARQ process with the $1^{st}$ CC, it may be restricted that scheduling of the $2^{nd}$ transport block starts after giving up retransmission of the $1^{st}$ transport block (i.e., when retransmission is no longer performed even if transmission of the $1^{st}$ transport block is not successful).

Figure 14:
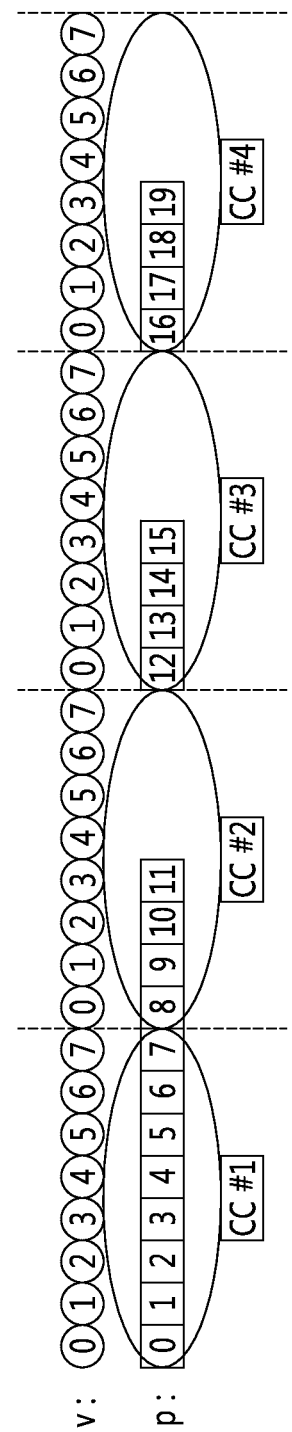
FIG. 14 shows a method of managing an HARQ process according to an eighth embodiment of the present invention.

FIG. 14 shows a method of managing an HARQ process according to an eighth embodiment of the present invention.

Referring to FIG. 14, a priority may be given to each CC such that more effective HARQ processes are allocated to a CC having a top priority (this is called a reference CC or a primary CC). The reference CC may be a DL CC in which a PDCCH is transmitted or a DL CC corresponding to a UL CC in which a UL control signal is transmitted.

For example, assume that a CC #1 has a top priority, and a CC #2, a CC #3, and a CC #4 have the same priority. 8 effective HARQ processes may be allocated to the CC #1, and 4 effective HARQ processes may be allocated to each of the remaining CCs.

The HARQ process according to the aforementioned FIG. 7 to FIG. 13 may be allocated to the remaining CCs. That is, a different number of effective HARQ processes are allocated in unit of a CC set, or a shared HARQ process is allocated.

Figure 15:
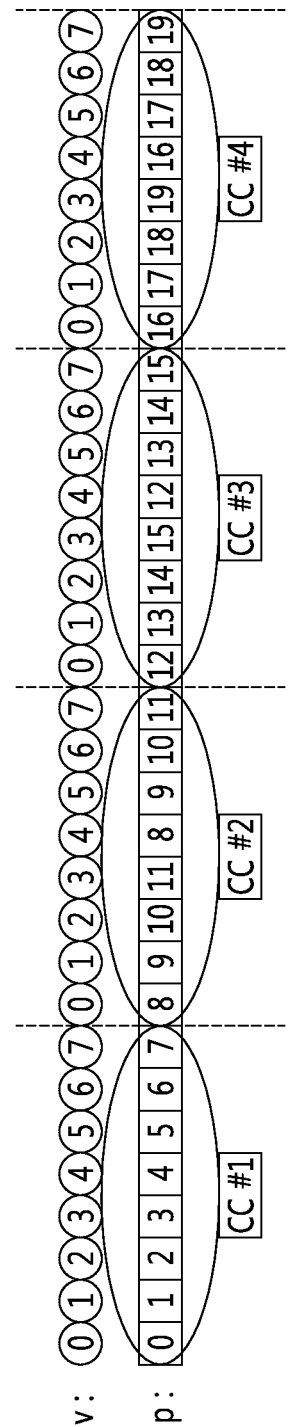
FIG. 15 shows an example of applying a second embodiment to the remaining component carriers (CCs) other than a CC #1 which is a reference CC.

FIG. 15 shows an example of applying a second embodiment to the remaining CCs other than a CC #1 which is a reference CC. That is, in the remaining CCs other than the CC #1 which is the reference CC, the same HARQ effective index may be indicated by using different HARQ indication indices.

Figure 16:
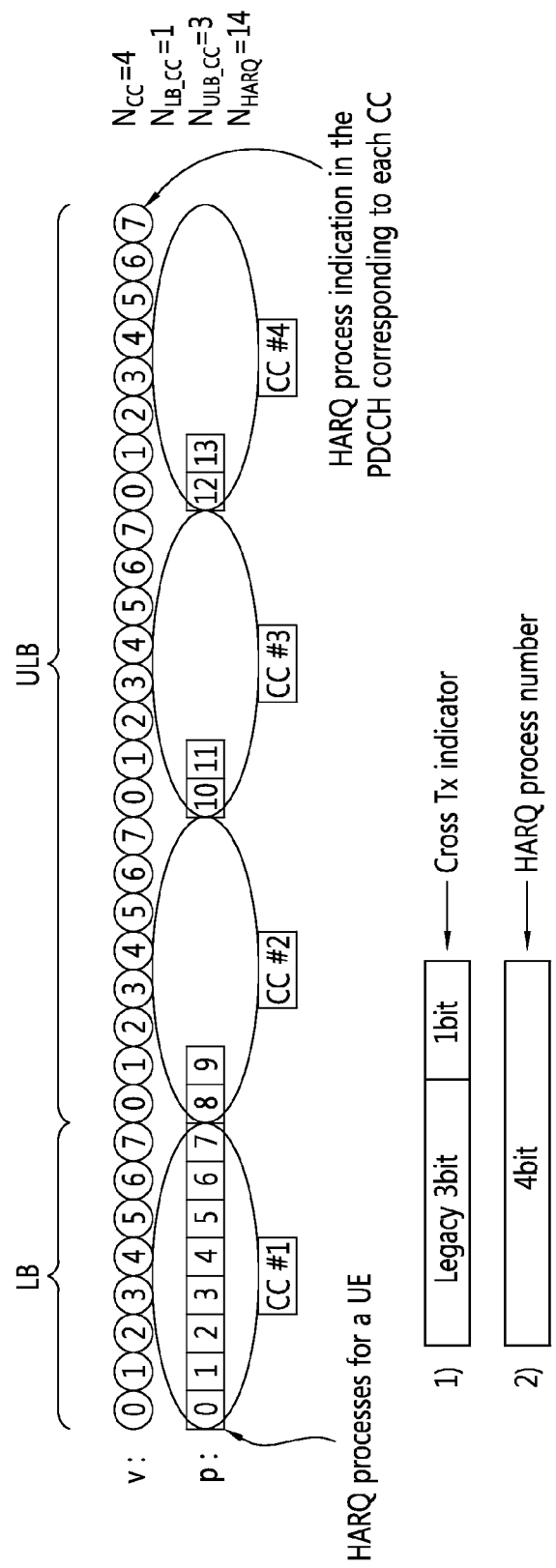
FIG. 16 shows an example of signaling, if 14 HARQ processes are shared between a primary cell and secondary cells.

FIG. 16 shows an example of signaling, if 14 HARQ processes are shared between a primary cell and secondary cells.

The number of bits of an HARQ process indication field of the conventional FDD is 3 bits, and the number of bits of an HARQ process indication field of TDD is 4 bits. However, the primary cell and the secondary cell are aggregated, and in this case, the secondary cells may operate using an UnLicensed Band (ULB) in TDD, and the primary cell may operate in FDD.

In this case, how to determine the HARQ process indication field included in a DL grant or UL grant transmitted in the primary cell may be a matter to be considered. The HARQ process indication field may consist of a 3-bit HARQ process indication field and a 1-bit cross transmission indicator (case 1). Alternatively, the number of bits of the HARQ process indication field may be applied by extending to 4 bits similarly to TDD according to the number of $M_{all}$ (case 2). In the case 1, the HARQ process of the secondary cell cannot but be shared with the primary cell, whereas in the case 2, the HARQ process can be advantageously shared between all cells with the same number of bits.

Figure 17:
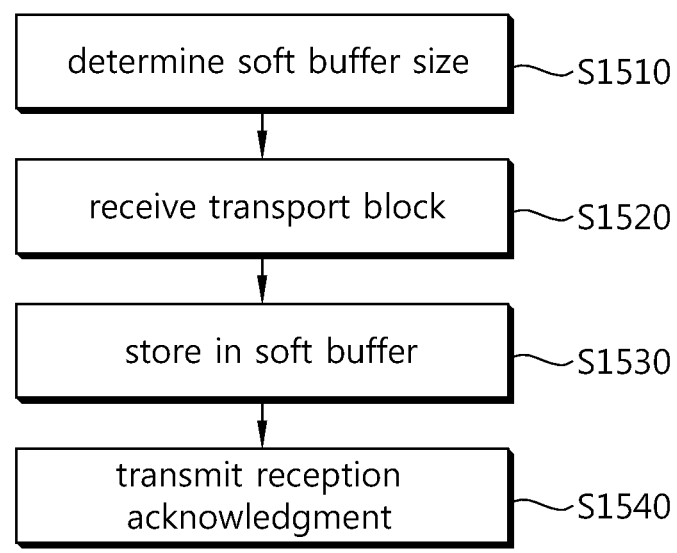
FIG. 17 is a flowchart showing a method of performing HARQ according to the present invention.

FIG. 17 is a flowchart showing a method of performing HARQ according to the present invention. This process may be implemented by a receiver. In DL HARQ, the receiver may be a part of a UE. In UL HARQ, the receiver may be a part of a BS.

A size of a soft buffer used in an effective HARQ process is determined on the basis of the maximum number of effective HARQ processes across a plurality of CCs (step S1510). The size of the soft buffer (or receive buffer) may be determined by Equation 6. The maximum number $M_{all}$ of the effective HARQ processes across the plurality of CCs may be greater than the number $M_{sc}$ of HARQ processes that can be indicated by using the HARQ indication index. The maximum number $M_{all}$ of the effective HARQ processes across the plurality of CCs may be less than a product of $M_{sc}$ and $N_{CC}$. $M_{all}$ may be reported by a BS to a UE through higher layer signaling.

A transport block is received from a transmitter (step S1520). The transport block may be subjected to rate matching according to the size of the soft buffer. The effective HARQ process for the transport block may be identified by using an HARQ indication index included in resource allocation information for receiving the transport block. An HARQ effective index to be mapped to the HARQ indication index may be defined by using a method of managing an HARQ process according to at least any one of the aforementioned embodiments of FIG. 7 to FIG. 15.

The transport block is stored in the soft buffer (step S1530).

A reception acknowledgement of the transport block is transmitted to the transmitter (step S1540). If reception of the transport block is successful, an ACK signal is sent, and if the reception of the transport block fails, a NACK signal is sent.

<HARQ Process According to CC Group>

As described above, a plurality of cells may be configured to a UE. The cell configured to the UE may be called a 'serving cell', and for convenience of explanation, is called a 'cell'. In this case, among the configured cells, a primary cell may always be in an activation state, whereas a secondary cell may be in an activation or deactivation state and may be activated by using a MAC message.

However, as described in Equation 5, there is a problem in that the soft buffer size of the conventional UE is determined not by the number of activated cells but by the number of cells configured to the UE.

In addition, if the UE fails to receive an RRC-reconfiguration or fails to properly perform decoding in a duration in which the number of cells configured to the UE through the RRC-reconfiguration is changed, a configured cell may be incorrectly recognized between a BS and the UE, and as a result, the soft buffer size is ineffectively managed.

In particular, an environment in which a macro cell and a plurality of small cells are used together is taken into consideration in a future wireless communication system. Herein, the macro cell may be the conventional BS, and the small cell may be a home-eNB installed in home, a pico-cell, etc.

The small cell may be used to compensate for a coverage of the macro cell, and may be controlled by the macro cell. In this sense, the macro cell and the small cell may correspond to a primary cell and a secondary cell, in that order.

A setup process in which the small cell is added/removed by the macro cell and an activation/deactivation thereof may be controlled. For the effective use of the small cell, the macro cell may configure in advance not only a small cell currently in use but also a small cell to be used later. In this case, according to the conventional technique, a UE must determine a soft buffer size under the assumption that an HARQ process is performed simultaneously in all configured small cells. However, there may be a case where some of the configured small cells are not used by being simultaneously activated, and it is ineffective to divide/manage the soft buffer size in this manner.

From an aspect of a primary cell and a secondary cell, in a situation where up to one secondary cell (i.e., SCell #1) is utilized, a BS may determine a cell to be used for a future replacement (i.e., SCell #2) as the secondary cell. In this case, a situation where two secondary cells (i.e., SCells #1 and #2) are used simultaneously does not occur, but it is assumed that the UE always share a soft buffer for each secondary cell. Therefore, resources may be wasted.

The present invention proposes a soft buffer division and management method considering cells which do not necessarily have separate soft buffers, according to a purpose of configuring a secondary cell, a channel state, and a UE situation. The present invention is significantly effective in a situation where the secondary cell is configured frequently.

Figure 18:
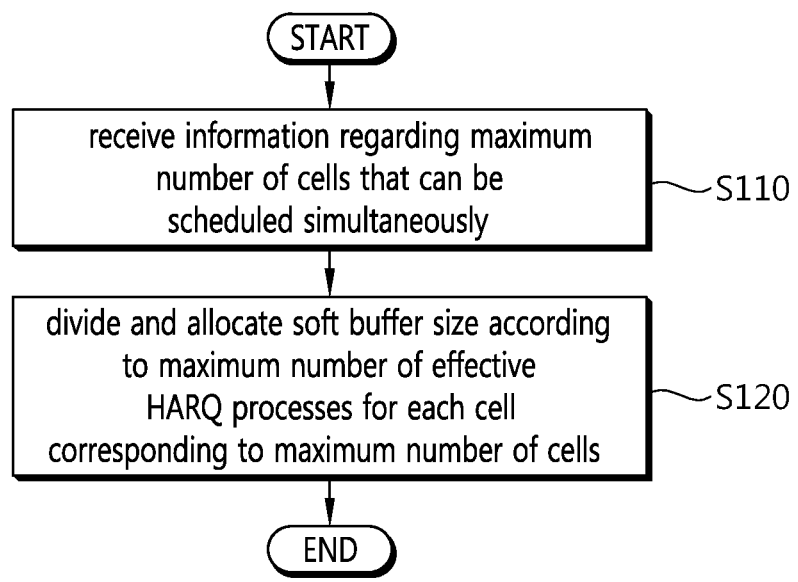
FIG. 18 shows a method of managing a soft buffer according to an embodiment of the present invention.

FIG. 18 shows a method of managing a soft buffer according to an embodiment of the present invention.

Referring to FIG. 18, a UE receives information regarding the maximum number of cells that can be scheduled simultaneously from a BS (step S110).

The maximum number of cells that can be scheduled simultaneously is denoted by $N^{sim}_{Cell}$. Information regarding $N^{sim}_{Cell}$ may be delivered from the BS to the UE through a higher layer signal such as an RRC message. $N^{sim}_{Cell}$ may be used in replacement with $N_{cc}$ in Equation 6. That is, the total number of CCs that can be used by the UE may be $N^{sim}_{Cell}$. Alternatively, $N^{sim}_{Cell}$ may be used in replacement with $N^{DL}_{cells}$ in Equation 5. That is, although a soft buffer size per code block is determined on the basis of the number $N^{DL}_{cells}$ of cells configured to the UE, if $N^{DL}_{cells}$ is replaced with $N^{sim}_{Cell}$, the soft buffer size per code block may be determined to the maximum number of cells that can be scheduled simultaneously. Therefore, the soft buffer can be more effectively managed.

The UE divides and allocates the soft buffer size according to the maximum number of effective HARQ processes for each cell corresponding to the maximum number of cells (step S120).

That is, the UE receives information regarding the maximum number of cells that can be scheduled simultaneously among a plurality of configured cells, and determines the size of the soft buffer for storing a transport block or code block of each cell on the basis of the information. In this case, the soft buffer size is determined on the basis of the maximum number of effective HARQ processes for each cell, with respect to cells corresponding to the maximum number of cells that can be scheduled.

For example, it is possible to apply a method in which the soft buffer size is equally divided by the aforementioned value $N^{sim}_{Cell}$, and is then divided according to the number of HARQ processes determined for each divided unit or a method in which the soft buffer size is divided by the number of HARQ processes determined for all $N^{sim}_{Cell}$ units.

When applying the aforementioned method, a cell group may be classified according to whether a cell configuration is frequently changed, and thereafter the method may be applied only for the cell group of which the cell configuration is frequently changed. For example, the cell group may be classified into a cell group consisting of a cell (including a macro cell) of which a cell configuration is not frequently changed similarly to a primary cell (such a cell group may be called a primary cell group, and may consist of only one primary cell) and a cell group consisting of a cell (e.g., a small cell, a secondary cell) of which a cell configuration is frequently changed (such as cell group may be called a non-primary cell group).

Alternatively, the primary cell group may be a group consisting of cells which can be scheduled simultaneously. In addition, the secondary cell group may consist of all of the remaining cells, i.e., cells which cannot be scheduled simultaneously.

$N^{sim}_{Cell}$ may be obtained for only cells belonging to the non-primary cell group other than the primary cell group. In this case, a buffer may be divided by a sum of $N^{sim}_{Cell}$ and the number of cells belonging to the primary cell group, or a soft buffer may be configured for each of the primary cell group and the non-primary cell group, and the configured buffer may be divided and used.

The non-primary cell group may be classified again into a sub-group. The sub-group may be a set of cells that can be scheduled only in one cell belonging to the sub-group. In this case, the number of cells that can be scheduled simultaneously to the UE may be the number of sub-groups of the non-primary cell group.

In addition, the soft buffer for the primary cell group (or the primary cell) may be allocated to have an independent soft buffer size, or may be allocated to have a specific size irrespective of the number of $N^{sim}_{Cell}$, or may be allocated to a minimum guaranteed buffer size.

The present invention is equivalently applied also to a case where the maximum number of cells that can be scheduled simultaneously in practice is determined to the number of cells configured to the UE, and all cells of which scheduling is monitored by the UE and which can be scheduled are called super-configured cells. Only terminologies are different, and thus the technical features of the present invention are equally applied.

The number of cells that can be scheduled simultaneously to the UE may be determined according to an activation/deactivation state of the cell. That is, the number of cells that can be scheduled simultaneously to the UE may be the number of activated cells.

Meanwhile, if the maximum number of effective HARQ processes is equal between cells, a soft buffer is divided and allocated by the maximum number of effective HARQ processes per cell. However, if the maximum number of effective HARQ processes is different between the cells, how to divide and allocate the soft buffer may be a matter to be considered.

For example, a different TDD UL-DL configuration may be applied to each of a plurality of cells, and the plurality of cells may be aggregated. Alternatively, cells having different frame structures may be aggregated similarly to an FDD radio frame and a TDD radio frame. In this case, the number of maximum effective HARQ processes may differ for each cell.

In this case, a division value of a soft buffer needs to be determined for $N^{sim}_{Cell}$ cells, and the following method may be used.

1. A sub-group may be configured, and a division value may be determined for each sub-group. In this case, the division value to be applied for each sub-group may include: 1) a smallest value of the maximum number of effective HARQ processes of cells in the sub-group; 2) the maximum number of effective HARQ processes of cells in the sub-group, 3) an average value of the maximum number of effective HARQ processes for cells in the sub-group, and if the average number is not an integer value, a closest integer value; or 4) a value configured through an RRC message for each sub-group.

2. The division value of the soft buffer may be determined to a common value for each of cells that belong to a non-primary cell group and that can be scheduled simultaneously. In this case, regarding each of cells that can be scheduled simultaneously, the division value to be applied may include: 1) a value $M_{limit}$; 2) the maximum number of effective HARQ processes of a primary cell; 3) an RRC configured value; 4) a minimum value of the maximum number of effective HARQ processes of cells in the non-primary cell group; 5) a maximum value of the maximum number of effective HARQ processes of cells in the non-primary cell group; and 6) an average value of the maximum number of effective HARQ processes of cells in the non-primary cell group. In this case, if the average value is not an integer value, a closest value greater or less than the average value may be applied. Alternatively, the division value to be applied may include: 7) a minimum value of the maximum number of effective HARQ processes of all configured cells; 8) a maximum value of the maximum number of effective HARQ processes of all configured cells, and 9) an average value of the maximum number of effective HARQ processes of all configured cells. In this case, if the average value is not an integer value, a closest integer value may be applied.

For example, a soft buffer for cells belonging to a non-primary cell group may be allocated by dividing as equally as possible by a value which is a product of the division value and $N^{sim}_{Cell}$ which is the number of cells that can be scheduled simultaneously among cells belonging to the non-primary cell group.

Meanwhile, the method described in <HARQ process sharing across CCs> may be applied for sub-groups of a non-primary cell group. In this case, the soft buffer for the cells belonging to the non-primary cell group may be divided as equally as possible by $M_{all}$ which is a sum of the maximum number of all effective HARQ processes of the sub-groups belonging to the non-primary cell group. Although the aforementioned method may also be applied to cells belonging to a primary cell group, in case of a primary cell, the maximum number of effective HARQ processes of the primary cell is preferably applied as the division value.

In addition, the aforementioned method may be selectively used according to a cell aggregation method. The cell aggregation method may be classified according to: 1) whether to aggregate cells having the same frame structure or cells having different frame structures; 2) whether to aggregate cells having the same TDD UL-DL configuration or cells having different TDD UL-DL configurations; and 3) whether it is an aggregation between macro cells, an aggregation between small cells, or an aggregation between the macro cell and the small cell. The present invention may be applied only to a specific aggregation method among the aforementioned cell aggregation methods, and this may be applied according to a pre-agreed rule or may be indicated by signaling. Broadcasting/RRC message/MAC message/PDCCH (or E-PDCCH), and the like may be used as a signaling method.

Figure 19:
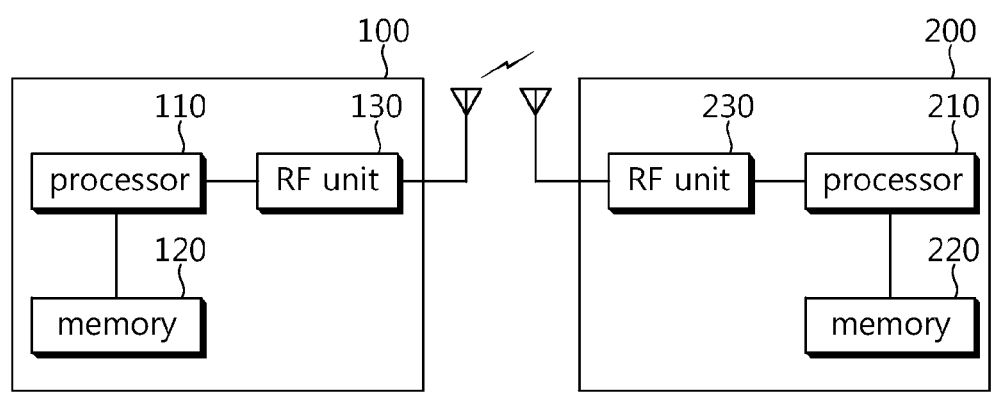
FIG. 19 is a block diagram showing a base station and a user equipment according to an embodiment of the present invention.

FIG. 19 is a block diagram showing a BS and a UE according to an embodiment of the present invention.

A BS 100 includes a processor 110, a memory 120, and a radio frequency (RF) unit 130. The processor 110 implements the proposed functions, procedures, and/or methods. Layers of a radio interface protocol may be implemented by the processor 110. The processor 110 reports the maximum number of cells that can be scheduled simultaneously to a UE, and performs an HARQ process. The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. Layers of a radio interface protocol may be implemented by the processor 210. The processor 210 manages a soft buffer for performing an HARQ process. For example, the processor 210 may receive information regarding the maximum number of cells that can be scheduled simultaneously among a plurality of configured cells, and may determine a size of the soft buffer for storing a transmission block or code block of each cell on the basis of the maximum number of effective HARQ processes for each cell corresponding to the information. The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, and/or a data processing unit. The memories 120 and 220 may include a read-only memory (ROM), a random access memory (RAM), a flash memory, a memory card, a storage medium, and/or other equivalent storage devices. The RF units 130 and 230 may include a base-band circuit for processing a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

What is claimed is:

1. A method of managing a soft buffer for a hybrid automatic repeat request (HARQ) of a user equipment configured with a plurality of cells in a wireless communication system, the method comprising:
receiving information related to a maximum number of cells that can be scheduled simultaneously among the plurality of cells,
wherein the information is received via a Radio Resource Control (RRC) message;
determining a size of the soft buffer for storing a transmission block or a code block for each of the maximum number of cells based on the received information; and
dividing the soft buffer into a number of buffer portions, the number of buffer portions corresponding to the maximum number of cells, and allocating a size to each of the buffer portions based on a maximum number of effective HARQ processes for each of the maximum number of cells,
wherein the plurality of cells include a primary cell group and a non-primary cell group, the primary cell group consisting of cells that have a cell configuration that changes less frequently than the cell configuration of the cells of the non-primary group,
wherein allocating a size to each of the buffer portions includes determining a size for each buffer portion that corresponds to a cell in the non-primary cell group, and
wherein the size of each buffer portion, in bits, is calculated using a following equation:

$$n_{SB} = \min\left(N_{cb}, \left\lfloor \frac{N'_{soft}}{C \cdot N_{cells}^{DL} \cdot K_{MIMO} \cdot \min(M_{DL\_HARQ}, M_{limit})} \right\rfloor\right)$$

where, $N_{cb}$ is the size of the code block in bits, C denotes the number of code blocks, $K_{MIMO}$ is 1 or 2 based on a transmission mode, $M_{DL\_HARQ}$ denotes the maximum number of effective HARQ processes, $M_{limit}$ is a constant equal to 8, $N^{DL}_{cells}$ denotes a number of configured cells, and $N'_{soft}$ is a total number of soft channel bits.

2. The method of claim 1, wherein allocating a size to each of the buffer portions includes allocating a pre-determined size to each of the buffer portions that corresponds with a cell in the primary cell group.

3. The method of claim 1, wherein the cells included in the primary cell group are cells for which the user equipment performs an initial connection establishment process or a connection re-establishment process with respect to a base station.

4. The method of claim 1, wherein the non-primary cell group includes a plurality of subgroups, and wherein only one cell from each subgroup is scheduled simultaneously.

5. A user equipment comprising:
a radio frequency (RF) unit that transmits and receives a radio signal; and
a processor, operatively coupled to the RF unit, that:
controls the RF unit to receive information related to a maximum number of cells that can be scheduled simultaneously among a plurality of cells, wherein the information is received via a Radio Resource Control (RRC) message;
determines a size of the soft buffer for storing a transmission block or a code block for each of the maximum number of cells based on the received information; and
divides the soft buffer into a number of buffer portions, the number of buffer portions corresponding to the maximum number of cells, and allocates a size to each of the buffer portions based on a maximum number of effective HARQ processes for each of the maximum number of cells,
wherein the plurality of cells include a primary cell group and a non-primary cell group, the primary cell group consisting of cells that have a cell configuration that changes less frequently than the cell configuration of the cells of the non-primary group,
wherein allocating a size to each of the buffer portions includes determining a size for each buffer portion that corresponds to a cell in the non-primary cell group, and
wherein the size of each buffer portion, in bits, is calculated using a following equation:

$$n_{SB} = \min\left(N_{cb}, \left\lfloor \frac{N'_{soft}}{C \cdot N^{DL}_{cells} \cdot K_{MIMO} \cdot \min(M_{DL\_HARQ}, M_{limit})} \right\rfloor\right)$$

where, $N_{cb}$ is the size of the code block in bits, C denotes the number of code blocks, $K_{MIMO}$ is 1 or 2 based on a transmission mode, $M_{DL\_HARQ}$ denotes the maximum number of effective HARQ processes, $M_{limit}$ is a constant equal to 8, $N^{DL}_{cells}$ denotes a number of configured cells, and $N'_{soft}$ is a total number of soft channel bits.

* * * * *